US010073892B1

(12) United States Patent
Khare et al.

(10) Patent No.: US 10,073,892 B1
(45) Date of Patent: Sep. 11, 2018

(54) ITEM ATTRIBUTE BASED DATA MINING SYSTEM

(71) Applicant: Amazon Technologies, Inc., Seattle, WA (US)

(72) Inventors: Vineet Khare, Bangalore (IN); Aswin Natarajan, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 482 days.

(21) Appl. No.: 14/738,097

(22) Filed: Jun. 12, 2015

(51) Int. Cl.
*G06F 17/30* (2006.01)

(52) U.S. Cl.
CPC .. *G06F 17/30539* (2013.01); *G06F 17/30572* (2013.01)

(58) Field of Classification Search
CPC ......... G06F 17/30539; G06F 17/30572; G06F 17/30165; G06F 2216/03
USPC ................................ 707/776, 785, 759, 805
See application file for complete search history.

(56) References Cited

U.S. PATENT DOCUMENTS

| 7,685,074 | B2 | 3/2010 | Linden et al. |
| 7,881,984 | B2 | 2/2011 | Kane, Jr. et al. |
| 8,032,425 | B2 | 10/2011 | Yi |
| 8,117,058 | B2 | 2/2012 | Smith |
| 8,352,473 | B2 * | 1/2013 | Fuxman et al. ............... 707/740 |
| 8,438,052 | B1 | 5/2013 | Chanda et al. |
| 2009/0083258 | A1 * | 3/2009 | Koren .................... G06Q 30/02 |
| 2013/0091159 | A1 * | 4/2013 | Fuxman et al. ............... 707/758 |

OTHER PUBLICATIONS

Agrawal et al., Database Mining: A Performance Perspective, 1993, Google Scholar, pp. 1-22.*

* cited by examiner

*Primary Examiner* — Jean B Fleurantin
(74) *Attorney, Agent, or Firm* — Knobbe, Martens, Olson & Bear, LLP

(57) ABSTRACT

Data mining systems and methods are disclosed for item recommendation based on frequent attribute-values associated with items. The system may determine commonalities in item attribute-values based on user transactions and identify frequent attribute-value tuples that include attribute-values that frequently co-occur in user transactions. The system may associate user interests with the frequent attribute-value tuples and recommend items to target users based thereon. A user-interface for presenting the recommendation allows users to explore item recommendations based on modifications to one or more frequent attribute-value tuples initially recommended to the user

18 Claims, 4 Drawing Sheets

ITEM ATTRIBUTE BASED DATA MINING SYSTEM

BACKGROUND

A variety of data mining systems and methods are known for detecting associations among items stored or represented in a database. For example, in the context of an electronic catalog of items, data mining processes are frequently used to identify items that tend to be viewed, purchased, downloaded, or otherwise selected in combination by users. For instance, items may be identified as belonging to a frequent itemset if a relatively large number of users bought the items in combination during same transactions. Frequent itemsets are often utilized for recommending items to users who may share similar interests.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
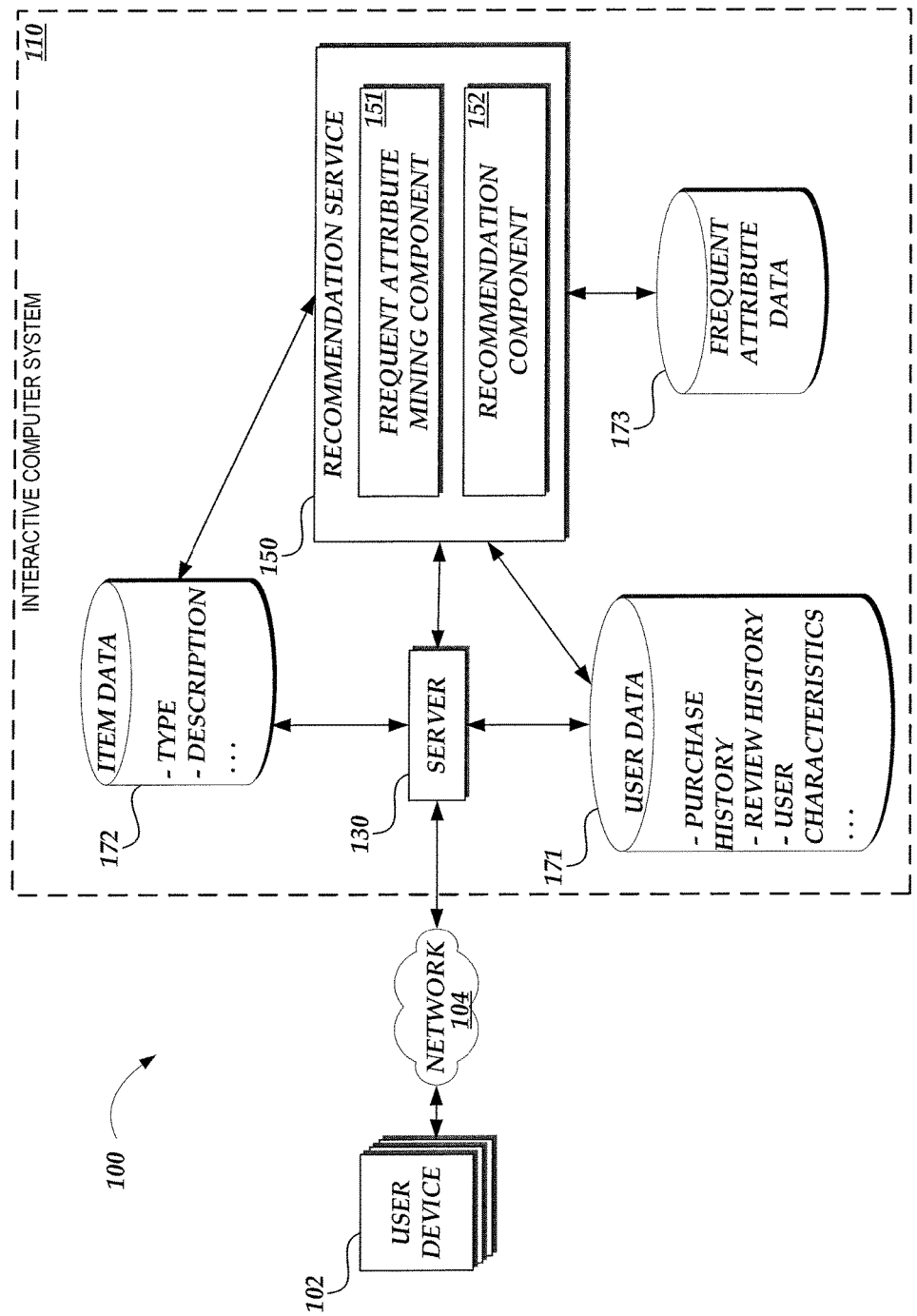
FIG. 1 illustrates an embodiment of a system for frequent attribute-value mining and item recommendation based thereon.

The present disclosure generally relates to the use of data mining methods for determining commonalities in item attribute-values based on user transactions and for recommending items to users based on configurable attribute-value combinations. The items may, for example, be products or services represented in an electronic catalog, documents, web pages, web sites, media files, RSS or other feeds to which users can subscribe, travel destinations represented on a travel agency site, or service providers from which services can be requested. Various attributes can be associated with the items. For example, attributes associated with books may include Author, Genre, Language, etc. Each particular item may be associated with specific attribute-values corresponding to the attributes. Continuing the example above, a particular book may be associated with attribute-values Author=Sue Monk Kidd, Genre=Fantasy, Language=English, and the like.

Accordingly, each attribute-value may represent a generalization or categorization of an aspect of an associated item. Item attribute-values may be available via metadata associated with items (e.g., item placement within a taxonomy of an electronic catalog, associated item type or descriptions, supplier or user inputs, or the like). Alternatively or in addition, item attribute-values can be computationally derived or extracted from the content, description or database record of an item (e.g., extracting subjects from a digital photo based on color or texture analysis, deriving tempo from a digital version of music based on encoding analysis, or detecting themes of a book based on textual or linguistic analysis). With item attribute-values available for use, each item may be represented by a set of attribute-values associated with the item. Accordingly, each transaction (e.g., a user purchase transaction) including one or more items may be represented by a combination of attribute-values rather than the items themselves.

Illustratively, any historical transaction data including items can be converted to transactions of attribute-value sets by incorporating attribute-values associated with the items in the data, and frequent attribute-value tuples can be extracted from the transactions. For example, if a significant number of transactions include books with attribute-values Genre=Fantasy and Language=English (even though the Author associated with the books may be different from transaction to transaction), a corresponding frequent attribute-value tuple can be <Genre=Fantasy, Language=English>. Therefore, a frequent attribute-value tuple may include a subset of attribute-values that are common to any set of transactions, and various tuple sizes (e.g., including 2, 3, 4, . . . , or n attribute-values) can be used accordingly.

In accordance with an illustrative embodiment, a computer-implemented recommendation service determines a number of frequent attribute-value tuples based on historical item acquisition data (e.g., purchase histories or other item acquisition histories). An item may be considered acquired by a user when the item is purchased, rented, licensed, downloaded, installed, added to a wish list, saved, tagged, recommended, or subscribed to by the user. Illustratively, the recommendation service may employ various frequent itemset mining methods to identify meaningful frequent attribute-value tuples. As described above, the mining methods can be applied to transactions represented by attribute-values rather than items. Thresholds or other criteria can be used to configure the frequent attribute-value tuple mining process. For example, any frequent attribute-value tuple must correspond to a minimum number of distinct transactions or a minimum number of distinct users associated with the transactions.

The recommendation service may associate user interest measures with individual frequent attribute-value tuples. For example, a user's explicit rating of an item can be converted to the user's interest measure for a frequent attribute-value tuple that corresponds to the item. Alternatively or in addition, a user interest measure for a particular frequent attribute-value tuple can be derived from the user's interactions (e.g., past purchases) with items corresponding to the particular frequent attribute-value tuple. The recommendation service may employ various collaborative filtering methods to measure user interests where there is insufficient data for explicit rating conversion or user interaction based derivation. Accordingly, the associations between frequent attribute-value tuples and users are quantified by respective user interest measures.

The recommendation service may then generate recommendations for any individual user based on the frequent attribute-value tuples and the user interest measures. For example, the recommendation service may identify one or more frequent attribute-value tuples associated with sufficiently high user interest measures (e.g., above a predetermined threshold) with respect to a particular user, and use these frequent attribute-value tuples as a basis for recommending items to the particular user. For example, FIG. 2 illustrates an embodiment of a user interface that facilitates such recommendation.

Figure 2:
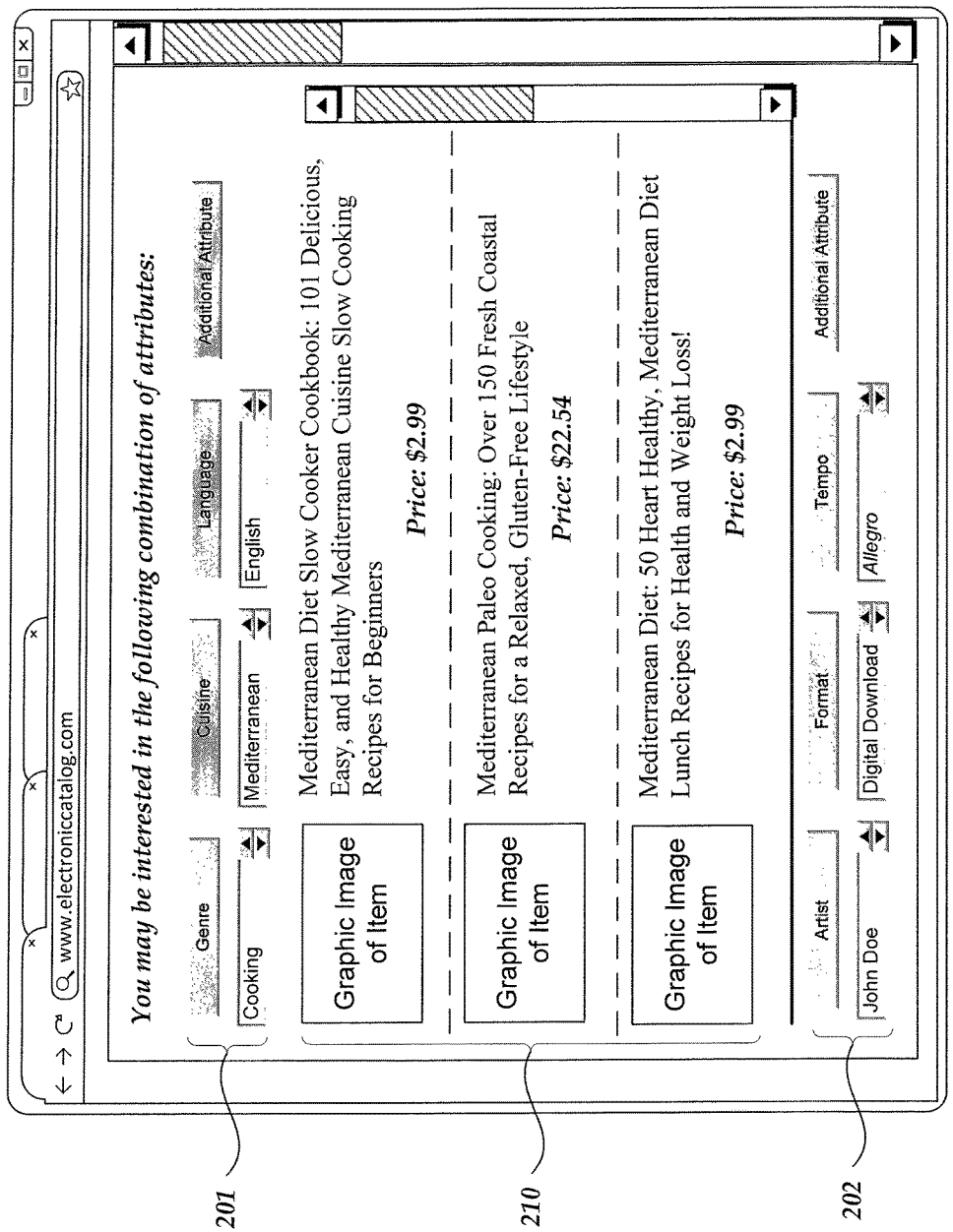
FIG. 2 illustrates an embodiment of a user interface that facilitates item recommendation based on frequent attribute-values.

As illustrated in FIG. 2, two frequent attribute-value tuples are presented to the user: the upper portion 201 of the user interface presents a first frequent attribute-value tuple <Genre=Cooking, Cuisine=Mediterranean, Language=English> using a combination of buttons (representing attributes) and corresponding dropdown menus (representing choices of attribute-values corresponding to an attribute); the lower portion 202 of the user interface presents a second frequent attribute-value tuple <Artist=John Doe, Format=Digital Download, Tempo=Allegro> using another combination of buttons and corresponding dropdown menus.

In this example, the user has activated the first frequent attribute-value tuple, for example, by clicking on the upper portion 201. The user interface then presents a middle portion 210 where a list of items corresponding to the first frequent attribute-value tuple is presented. The list of items can be sorted or ordered, for example, based on sales volume, view times, user ratings, or other popularity measures. The frequent attribute-value tuples as presented can be modified, revised, or otherwise changed by the user via the user interface. For example, the user may change or delete an attribute by clicking on a button corresponding to the attribute, change an attribute-value corresponding to an attribute by clicking on and selecting from a respective dropdown menu, or add new attribute (and designate a corresponding new attribute-value) by clicking on the "Additional Attribute" button. In some embodiments, the user interface may enable the user to select multiple attribute-values corresponding to a same attribute, for example, by providing multiple-selection input fields instead of dropdown menus. In accordance with the modification, the list of items presented will be updated to match the modified frequent attribute-value tuple. These user interactions with the user interface allow the user to explore various collections of items within a "neighborhood" that starts from a frequent attribute-value tuple as initially recommended to the user.

Further, the recommendation system may cluster or group users based on their characteristics, preferences, or biases. The recommendation service may utilize or incorporate different configurations in the methods for determining frequent attribute-value tuples, for associating user interest measures, or for recommending items as applicable to distinct clusters of users. Alternatively or in addition, the recommendation service may use independently configured and implemented processes to achieve the above for different user groups.

FIG. 1 depicts an embodiment of a network environment 100 and system 110 capable of recommending items based on frequent attribute-value tuples using processes and functionalities disclosed herein. In the environment 100, users can access an interactive computer system 110 with user devices 102. The user devices 102 that access the interactive computer system 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, and/or the like. The user devices 102 access the interactive computer system 110 over a network 104, which can be a publicly accessible network of linked networks, possibly operated by various distinct parties, such as the Internet. In other embodiments, the network 104 may include a private network, personal area network ("PAN"), LAN, WAN, cable network, satellite network, any other medium of computer data transfer, or some combination thereof.

The interactive computer system 110 can be implemented with one or more physical servers or other computing machines. Each of the components depicted in the interactive computer system 110 can include hardware and/or software for performing various features. In some implementations, the interactive computer system 110 may include specialized hardware for performing one or more processes described herein. For example, in some cases, the recommendation service 150 may be implemented using specialized hardware dedicated to frequent attribute-value tuples mining, user interest measure association, or item recommendation based thereon. In one embodiment, the interactive computer system 110 is a network site that allows users to interact with a catalog of items.

In the depicted embodiment, the interactive computer system 110 includes several components that can be implemented in hardware and/or software. For instance, the interactive computer system 110 includes one or more servers 130 for receiving, processing, and responding to requests from user devices 102. The one or more servers 130 can include web servers, application servers, database servers, or other types of servers. The servers 130 can be geographically co-located or geographically dispersed.

The one or more servers 130 may access or update information about items in an item database 172 that may store information about items and their associated attribute-values, including item details (e.g., type and description), item categories, item relationships, item ratings, customer reviews, author pages, user-generated list pages, forum pages, blog pages, and the like. As described above, attribute-values may also include those derived or extracted from the content of items or relevant information associated with items. In one embodiment, at least some of the attribute information is arranged in accordance with a hierarchy or taxonomy, so that an attribute may be a sub- or super-concept of another attribute.

The one or more servers 130 may also access or update information about users in a user database 171 that may store various user features and activity information. User features may include user characteristic or demographic information, such as age, gender, ethnicity, religion, geographic location, occupation, income, spending levels, interests, hobbies, preferences, settings, combinations of the same, and/or the like. User activity information may include information such as a user's purchases, selections, clicks, views, searches, ratings, page requests, additions or removals of items to wish lists and shopping carts, user interface events, tagging activity, combinations of the same, and/or the like.

The interactive computer system 110 also includes the recommendation service 150 that is communicatively connected with the servers 130, the user database 171, the item database 172 and a frequent attribute database 173. The recommendation service 150 includes a frequent attribute mining component 151 and a recommendation component 152.

The frequent attribute database 173 may include relational tables and datasets that store information about frequent attribute-value tuples and their user interest measures with respect to different users. Illustratively, frequent attribute-value tuples and user interest measures may be organized in one or more matrices, where columns of the matrix may represent different frequent attribute-value tuples and rows of the matrix may represent distinct users. As such, individual values of the matrix may correspond to a user interest measure with respect to a particular frequent attribute-value tuple and a particular user.

The data maintained by the frequent attribute database 173 may be generated by the frequent attribute mining component 151 based on historical user transaction data and user rating data. As described above, the frequent attribute mining component 151 may employ various frequent itemset mining methods to identify meaningful frequent attribute-value tuples from item acquisition transactions represented by attribute-values rather than items. Thresholds or other criteria can be used to configure the frequent attribute-value tuple mining process. The frequent attribute mining component 151 may associate user interest measures with individual frequent attribute-value tuples based on explicit rating conversion, user interaction based derivation, or various collaborative filtering methods.

The recommendation component 152 may implement item recommendation functionalities based on the frequent attribute-value tuples as disclosed herein. For example, recommendation component 152 may identify relevant frequent attribute-value tuples for any particular user based on user interest measures, identify items corresponding to recommended or user-modified frequent attribute-value tuples, facilitate generation of user interfaces for presenting the frequent attribute-value tuples and their corresponding items, or perform other relevant functionalities.

It should be noted that functionalities of the various components of the interactive computer system 110 can be distributed across multiple machines, networks, and other computing resources. The various components of the interactive computer system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

FIG. 2 illustrates an embodiment of a user interface that facilitates item recommendation based on frequent attribute-values. In this embodiment, an upper portion 201 of the user interface presents a first frequent attribute-value tuple <Genre=Cooking, Cuisine=Mediterranean, Language=English> using a combination of buttons (representing attributes) and corresponding dropdown menus (representing choices of attribute-values corresponding to an attribute), a middle portion 210 presents a set of items corresponding to the first frequent attribute-value tuple, and a lower portion 202 presents a second frequent attribute-value tuple <Artist=John Doe, Format=Digital Download, Tempo=Allegro> using another combination of buttons and corresponding dropdown menus.

As previously described, the frequent attribute-value tuples as presented can be modified, revised, or otherwise changed by a user via the user interface. For example, the user may change or delete an attribute by clicking on a button corresponding to the attribute, change an attribute-value corresponding to an attribute by clicking on and selecting from a respective dropdown menu, or add new attribute (and designate a corresponding new attribute-value) by clicking on the "Additional Attribute" button. As described above, in some embodiments, the user interface allows the user to select multiple attribute-values for a same attribute. In accordance with the modification, the list of items presented will be updated to match the modified frequent attribute-value tuple. Accordingly, the user may interact with the user interface to explore various collections of items within a "neighborhood" that starts from a frequent attribute-value tuple as initially recommended to the user.

Figure 3:
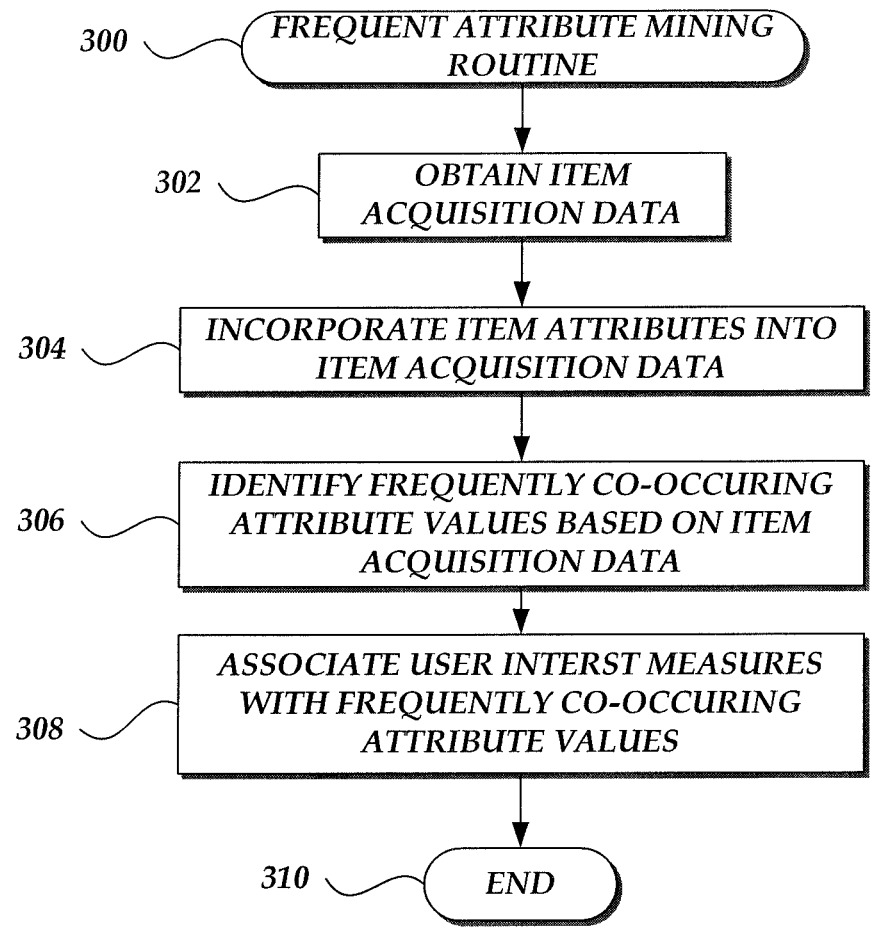
FIG. 3 illustrates an embodiment of a frequent attribute mining routine implemented by a recommendation service.

FIG. 3 illustrates an embodiment of a frequent attribute mining routine implemented by the recommendation service 150. The frequent attribute mining routine of FIG. 3 starts at block 300. At block 302, the recommendation service 150 obtains item acquisition data that serves as the basis for frequent attribute mining. The item acquisition data may include user transaction records ranging over a specified period of time (e.g., the most recent six months) that are obtained from the user database 171. Further, the item acquisition data may correspond to data aggregated over a large population (e.g., many thousands or millions) of users. As previously described, individual user transaction records may include one or more items acquired by the user during a same session or transaction. The item acquisition data may be associated with multiple distinct users and some of the users may be associated with multiple distinct acquisition transactions.

At block 304, the recommendation service 150 incorporates item attributes into the item acquisition data. As previously described, individual items may be associated with various attributes, which may have particular attribute-values each representing a generalization or categorization of an aspect of the associated item. Item attribute-values may be available explicitly via metadata associated with items (e.g., item placement within a taxonomy of an electronic catalog, associated item type or descriptions, supplier or user inputs, or the like). Alternatively or in addition, item attribute-values can be computationally derived or extracted from content, description, or metadata associated with an item (e.g., extracting subjects from a digital photo based on color or texture analysis, deriving tempo from a digital version of music based on encoding analysis, or detecting themes of a book based on textual or linguistic analysis). With item attribute-values available for use, the recommendation service 150 may augment each item transaction record with a set of attribute-values associated with the item. Accordingly, the recommendation service 150 may convert each item acquisition transaction into a set of particular attribute-values corresponding to the one or more items included in the transaction.

At block 306, the recommendation service 150 identifies attribute-values that frequently co-occur in same transactions, based on the item acquisition data. The frequently co-occurring attribute-values can be generally referred to as frequent attribute-value tuples. Illustratively, the recommendation service may employ various frequent itemset mining methods to identify meaningful frequent attribute-value tuples. As described above, the mining methods can be applied to transactions represented by attribute-values rather than items. Thresholds or other criteria can be used to configure the frequent attribute-value tuple mining process. For example, a lower or upper limit may be set on the number of distinct transactions, the number of distinct users, or the number of attributes that may correspond to certain frequent attribute-value tuples.

At block 308, the recommendation service 150 may associate user interest measures with individual frequent attribute-value tuples. For example, a user's explicit rating of an item can be converted to the user's interest measure for a frequent attribute-value tuple that corresponds to the item. In some scenarios, a user may have rated multiple items corresponding to the same frequent attribute-value tuple. In these scenarios, the recommendation service 150 may compute an average value from the multiple user ratings to be associated with the frequent attribute-value tuple.

Alternatively or in addition, a user interest measure for a particular frequent attribute-value tuple can be derived from the user's interactions (e.g., past browsing patterns, purchases, returns, cancelations, etc.) with items corresponding to a particular frequent attribute-value tuple. For example, a user's return of a purchased item may indicate that a low user interest measure should be associated with the corresponding frequent attribute-value tuple. The recommendation service 150 may also employ various collaborative filtering methods to estimate or extrapolate user interests where insufficient explicit ratings data exists. Accordingly, the associations between frequent attribute-value tuples and users are quantified by respective user interest measures. The routine of FIG. 3 ends at block 310.

Figure 4:
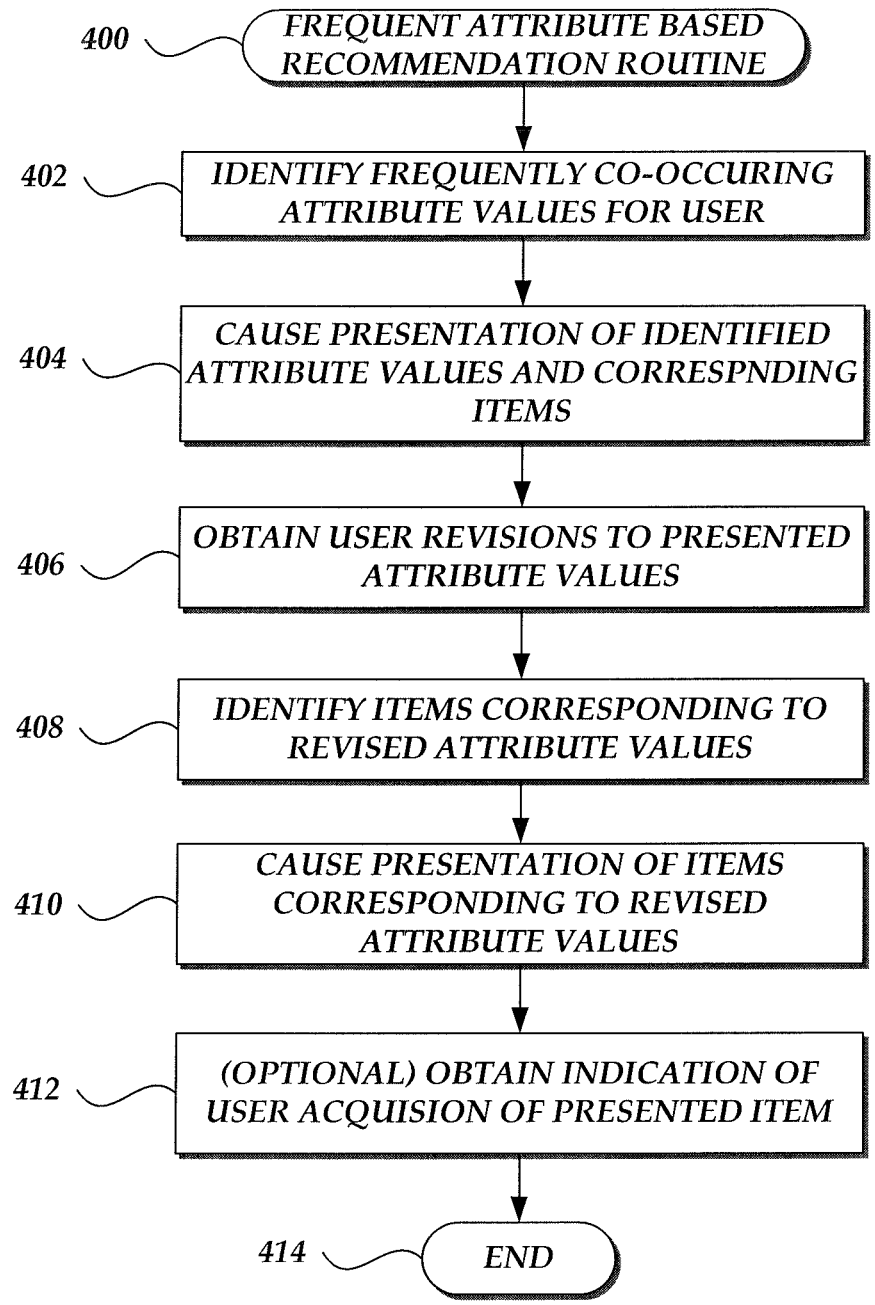
FIG. 4 illustrates an embodiment of a frequent attribute based recommendation routine implemented by the recommendation service.

FIG. 4 illustrates an embodiment of a frequent attribute based recommendation routine implemented by the recommendation service 150. The routine of FIG. 4 starts at block 400. At block 402, the recommendation service 150 identifies one or more available frequent attribute-value tuples for a target user in order to generate corresponding item recommendations. Illustratively, the recommendation service 150 may examine user interest measures that link the target user to frequent attribute-value tuples as generated by the routine of FIG. 3 (e.g., by parsing a row of data corresponding to the target user in one or more matrices of user interest measures as maintained by the frequent attribute database 173), and may sort or order frequent attribute-value tuples into a list based on their corresponding user interest measures with respect to the target user. The recommendation service 150 may identify one or more frequent attribute-value tuples that are associated with sufficiently high user interest measures (e.g., above a predetermined threshold) or are ranked sufficiently high based on the ordered list (e.g., the top 3 frequent attribute-value tuples by user interest measure with respect to the target user). The recommendation service 150 may then use the identified frequent attribute-value tuples as basis for recommending items to the target user.

At block 404, the recommendation service 150 causes presentation of the identified frequent attribute-value tuples and corresponding items. Illustratively, the recommendation service can generate code that corresponds to or facilitates the presentation of a user interface (e.g., a web page or application) rendered on the target user's device 102. For example, FIG. 2 illustrates an embodiment of such a user interface. As illustrated in FIG. 2, two frequent attribute-value tuples are presented to the user: the upper portion 201 of the user interface presents a first frequent attribute-value tuple <Genre=Cooking, Cuisine=Mediterranean, Language=English> using a combination of buttons (representing attributes) and corresponding dropdown menus (representing choices of attribute-values corresponding to an attribute); the lower portion 202 of the user interface presents a second frequent attribute-value tuple <Artist=John Doe, Format=Digital Download, Tempo=Allegro> using another combination of buttons and corresponding dropdown menus. In this example, the user has activated the first frequent attribute-value tuple, for example, by clicking on the upper portion 201. The user interface then presents a middle portion 210 where a list of items corresponding to the first frequent attribute-value tuple is displayed. The list of items can be identified by the recommendation service from the item database 172, and sorted, ordered, or filtered based on sales volume, view times, user ratings, or other popularity measures.

With reference back to FIG. 4, at block 406 the recommendation service 150 obtains indications of user revisions to at least one of the presented frequent attribute-value tuples. For example, the frequent attribute-value tuples as presented in FIG. 2 can be modified, revised or otherwise changed via the user interface: a user may change or delete an attribute by clicking on a button corresponding to the attribute, change an attribute-value corresponding to an attribute by clicking on and selecting from a respective dropdown menu, or add new attribute (and designate a corresponding new attribute-value) by clicking on the "Additional Attribute" button. As described above, in some embodiments, the user interface allows the user to select two or more attribute-values for a same attribute.

In some embodiments, the available options of attributes or attribute-values for a user to choose from may be based on other frequent attribute-value tuples that have been identified for the user at block 402. For example, attribute-value Language=French may have appeared in one of the other identified frequent attribute-value tuples (with relatively high user interest measures), then French may be an option included in the dropdown menu below the "Language" attribute button. As another example, attribute-value Language=Japanese has never appeared in any of the other identified frequent attribute-value tuples or has only appeared in those with relatively low user interest measures, then Japanese may not be an option included in the dropdown menu below the "Language" attribute button (even if there exist many books available in the item database 172 that correspond to an attribute-value tuple <Genre=Cooking, Cuisine=Mediterranean, Language=Japanese>).

In other embodiments, the available options of attribute-values corresponding to individual attributes are constrained, interlinked, or otherwise inter-related among the combination of attributes. For example, given a selection of Genre=Cooking and Cuisine=Mediterranean, the attribute-value options populated with respect to Language may be limited to Chinese, English, French, and Japanese, because an associated electronic catalog may not have any available items regarding Mediterranean cooking associated with other languages. These constraints or inter-relations may apply as the user makes any change to the selection of attribute-values or adds/deletes any attribute, so that appropriate attribute-value options may be populated automatically for the affected attribute(s).

Once the recommendation service 150 receives the indication of revision or modification to the presented frequent attribute-value tuples, at block 408, the recommendation service 150 may generate a list of items corresponding to the revised frequent attribute-value tuple, for example, from the item database 172. The list of newly identified items can similarly be sorted, ordered, or filtered based on various criteria. At block 410, the recommendation service 150 may cause presentation of the items corresponding to the revised frequent attribute-value tuples. This can be accomplished via the same user interface, for example, by updating the middle portion 210 of FIG. 2.

With reference back to FIG. 4, optionally at block 412, the recommendation service 150 obtains an indication that the user acquired one of the presented items. In some embodiments, the indication may be generated by the user interface which, for example, may enable the user to acquire a presented item directly by clicking on an "add to cart," "buy now" or "add to wishlist" button. The indication may then be transmitted to the recommendation service 150. In other embodiments, the recommendation service obtains the indication via the retrieval of updated user transaction data from the user database 171 or from the servers 130. In this case, the retrieval of updated data may occur regularly (e.g., every month) or upon a triggering event (e.g., a certain amount of new transactions has occurred since last time's data retrieval). Such a data retrieval step may be functionally equivalent to block 302 of FIG. 3. With reference back to FIG. 4, the routine ends at block 414.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for item recommendation based on item attribute-value tuples that are frequent to user transactions, comprising:

obtaining item acquisition data indicating a plurality of transactions associated with a set of users, wherein individual transactions include one or more items acquired by a corresponding user;

incorporating item attribute-values into the item acquisition data, wherein individual items are associated with one or more item attribute-values;

identifying a set of attribute-value tuples, wherein individual attribute-value tuples of the set of attribute-value tuples include two or more item attribute-values that co-occur in individual transactions of a subset of the plurality of transactions;

associating user interest measures with individual attribute-value tuples of the set of attribute-value tuples, wherein associating user interest measures with individual attribute-value tuples comprises generating a user interest measure for the attribute-value tuple based, at least in part, on one or more user ratings of an item corresponding to the attribute-value tuple;

identifying a first attribute-value tuple from the set of attribute-value tuples for a target user based, at least in part, on the user interest measures;

causing presentation, to the target user, of a first recommendation based, at least in part, on the first attribute-value tuple;

obtaining, from the target user, an indication of a modification to the first attribute-value tuple;

identifying items corresponding to the modified first attribute-value tuple; and causing presentation, to the target user, of a second recommendation based, at least in part, on the items corresponding to the modified first attribute-value tuple;

the method performed programmatically by one or more computing systems under control of executable program code.

2. The method of claim 1, wherein individual items include a product or service represented in an electronic catalog system.

3. The method of claim 1, wherein one or more items acquired by a corresponding user correspond to one or more items purchased, rented, licensed, downloaded, installed, added to a wish list, saved, tagged, recommended, or subscribed to by the corresponding user.

4. The method of claim 1, wherein individual item attribute-values represent a generalization or categorization of an aspect of a corresponding item.

5. The method of claim 1, wherein at least two transactions of the subset of transactions are associated with different users.

6. The method of claim 1, wherein identifying a first attribute-value tuple for a target user comprises identifying an attribute-value tuple associated with a user interest measure in connection with the target user.

7. The method of claim 1, wherein the presentation of the first recommendation includes presenting a user-interface representing the first attribute-value tuple.

8. The method of claim 7, wherein the indication of modification to the first attribute-value tuple is obtained based, at least in part, on the target user's interaction with the user-interface.

9. The method of claim 1, wherein the modification to the first attribute-value tuple includes changes to at least one attribute-value of the attribute-value tuple.

10. A system for item recommendation based on item attribute-value tuples that are frequent to user transactions, the system comprising:

a computing system comprising one or more hardware processors, the computing system programmed with executable instructions to perform a process that comprises:

obtaining item acquisition data indicating a plurality of transactions associated with a set of users, wherein individual transactions include one or more items acquired by a corresponding user;

incorporating item attribute-values into the item acquisition data, wherein individual items are associated with one or more item attribute-values;

identifying a set of attribute-value tuples, wherein individual attribute-value tuples of the set of attribute-value tuples include two or more item attribute-values that co-occur in individual transactions of a subset of the plurality of transactions;

associating user interest measures with individual attribute-value tuples of the set of attribute-value tuples, wherein associating user interest measures with individual attribute-value tuples comprises generating a user interest measure for the attribute-value tuple based, at least in part, on one or more user ratings of an item corresponding to the attribute-value tuple;

identifying a first attribute-value tuple from the set of attribute-value tuples for a target user based, at least in part, on the user interest measures;

causing presentation, to the target user, of a first recommendation based, at least in part, on the first attribute-value tuple;

obtaining, from the target user, an indication of a modification to the first attribute-value tuple;

identifying items corresponding to the modified first attribute-value tuple; and causing presentation, to the target user, of a second recommendation based, at least in part, on the items corresponding to the modified first attribute-value tuple.

11. The system of claim 10, wherein individual items include a product or service represented in an electronic catalog system.

12. The system of claim 10, wherein one or more items acquired by a corresponding user correspond to one or more items purchased, rented, licensed, downloaded, installed, added to a wish list, saved, tagged, recommended, or subscribed to by the corresponding user.

13. The system of claim 10, wherein individual item attribute-values represent a generalization or categorization of an aspect of a corresponding item.

14. The system of claim 10, wherein at least two transactions of the subset of transactions are associated with different users.

15. The system of claim 10, wherein identifying a first attribute-value tuple for a target user comprises identifying an attribute-value tuple associated with a user interest measure in connection with the target user.

16. The system of claim 10, wherein the presentation of the first recommendation includes presenting a user-interface representing the first attribute-value tuple.

17. The system of claim 16, wherein the indication of modification to the first attribute-value tuple is obtained based, at least in part, on the target user's interaction with the user-interface.

18. The system of claim 10, wherein the modification to the first attribute-value tuple includes changes to at least one attribute-value of the attribute-value tuple.

* * * * *